(12) United States Patent
Adams

(10) Patent No.: US 12,351,171 B2
(45) Date of Patent: Jul. 8, 2025

(54) AUTONOMOUS MACHINE OPERATION USING VIBRATION ANALYSIS

(71) Applicant: Caterpillar SARL, Geneva (CH)

(72) Inventor: Nathan Adams, Durham (GB)

(73) Assignee: Caterpillar SARL, Geneva (CH)

( * ) Notice: Subject to any disclaimer, the term of this patent is extended or adjusted under 35 U.S.C. 154(b) by 0 days.

(21) Appl. No.: 17/796,717

(22) PCT Filed: Jan. 28, 2021

(86) PCT No.: PCT/EP2021/025035
§ 371 (c)(1),
(2) Date: Aug. 1, 2022

(87) PCT Pub. No.: WO2021/156003
PCT Pub. Date: Aug. 12, 2021

(65) Prior Publication Data
US 2023/0101825 A1    Mar. 30, 2023

(30) Foreign Application Priority Data

Apr. 2, 2020 (GB) .................................... 2001490

(51) Int. Cl.
*B60W 30/14* (2006.01)
*B60W 30/20* (2006.01)
(Continued)

(52) U.S. Cl.
CPC ........ *B60W 30/143* (2013.01); *B60W 30/146* (2013.01); *B60W 30/20* (2013.01);
(Continued)

(58) Field of Classification Search
CPC .. B60W 30/143; B60W 30/146; B60W 30/20; B60W 40/02; B60W 40/105; B60W 40/12; B60W 50/0205; B60W 60/00186; B60W 60/0025; B60W 2030/206; B60W 2050/0028; B60W 2300/126; B60W 2300/14; B60W 2420/905;
(Continued)

(56) References Cited

U.S. PATENT DOCUMENTS

| 7,203,679 B2 | 4/2007 | Hidetoshi et al. |
| 9,873,296 B2 * | 1/2018 | Wieckhorst ........... B60C 23/002 |

(Continued)

FOREIGN PATENT DOCUMENTS

| GB | 2569750 A | 6/2019 |
| JP | S58008411 A | 1/1983 |

(Continued)

OTHER PUBLICATIONS

International Search Report related to Application No. PCT/EP2021/025035; reported on Jun. 17, 2021.
(Continued)

*Primary Examiner* — Joan T Goodbody

(57) ABSTRACT

Operating an autonomous machine using analysis of machine vibration while it is operational. Accelerometers are used to measure the machines vibrations while it is being operated. If the vibrations exceed a predetermined acceleration a controller adjust the velocity of the machine to prevent/reduce further vibrations.

16 Claims, 2 Drawing Sheets

Figure 1:
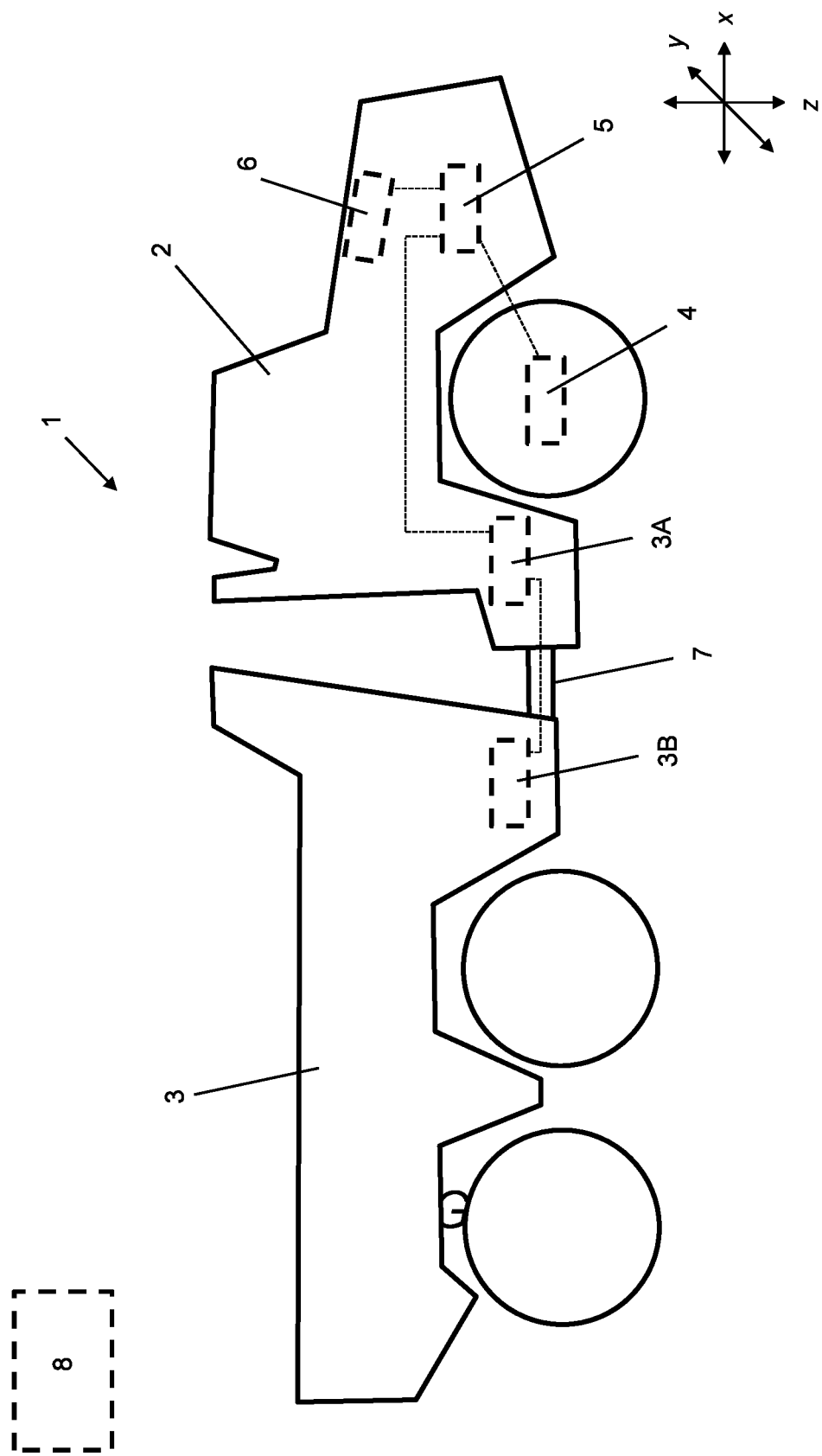

(51) Int. Cl.
  *B60W 40/02* (2006.01)
  *B60W 40/105* (2012.01)
  *B60W 40/12* (2012.01)
  *B60W 50/02* (2012.01)
  *B60W 60/00* (2020.01)
  *B60W 50/00* (2006.01)

(52) U.S. Cl.
  CPC .......... *B60W 40/02* (2013.01); *B60W 40/105* (2013.01); *B60W 40/12* (2013.01); *B60W 50/0205* (2013.01); *B60W 60/00186* (2020.02); *B60W 60/0025* (2020.02); *B60W 2030/206* (2013.01); *B60W 2050/0028* (2013.01); *B60W 2300/14* (2013.01); *B60W 2300/147* (2024.01); *B60W 2420/905* (2013.01); *B60W 2520/105* (2013.01); *B60W 2520/22* (2013.01); *B60W 2530/20* (2013.01); *B60W 2555/20* (2020.02); *B60W 2556/45* (2020.02)

(58) Field of Classification Search
  CPC ....... B60W 2520/105; B60W 2520/22; B60W 2530/20; B60W 2555/20; B60W 2556/45; B60W 30/02; B60W 40/10; B60W 60/0013; B60W 2040/1392; B60W 2300/12; B60W 2300/152; B60D 1/00
  See application file for complete search history.

(56) References Cited

U.S. PATENT DOCUMENTS

| | | | |
|---|---|---|---|
| 2004/0130442 A1* | 7/2004 | Breed | G06V 20/593 340/449 |
| 2005/0060069 A1* | 3/2005 | Breed | G08G 1/166 701/408 |
| 2007/0044881 A1 | 3/2007 | Skoff | |
| 2009/0118960 A1 | 5/2009 | Harrison | |
| 2011/0022267 A1 | 1/2011 | Murphy | |
| 2015/0127229 A1 | 5/2015 | Goraya et al. | |
| 2019/0210418 A1 | 7/2019 | Hall et al. | |
| 2019/0227543 A1* | 7/2019 | Choe | G06T 11/206 |

FOREIGN PATENT DOCUMENTS

| | | | | |
|---|---|---|---|---|
| JP | H03284401 A | 12/1991 | | |
| WO | 2019109191 A1 | 6/2019 | | |
| WO | 2019241307 A2 | 12/2019 | | |
| WO | WO 2019241307 | * | 4/2020 | ...... B60W 30/18145 |

OTHER PUBLICATIONS

Great Britain Search Report related to Application No. GB2001490.8 reported on Aug. 5, 2020.

* cited by examiner

AUTONOMOUS MACHINE OPERATION USING VIBRATION ANALYSIS

CROSS-REFERENCE TO RELATED APPLICATION

This application is a 35 USC § 371 US National Stage filing of International Application No. PCT/EP2021/025035 filed on Aug. 12, 2021 which claims priority under the Paris Convention to Great Britain Patent Application No. 2001490.8 filed on Feb. 4, 2020.

BACKGROUND

The present disclosure relates to operation of autonomous machines. For example, off-road autonomous machines, autonomous machines for use in the construction industry, autonomous machines for use in the mining industry and/or the like.

Machines, in particular machines having pneumatic-tired wheels, such as off-road machines used for industrial purposes, can in operation suffer from "power hop". Power hop is a condition wherein bouncing of the machine can induce vertical oscillations of the machine which, dependent on the frequency response of the machine, can lead to substantial vertical machine oscillations that can negatively impact traction of the machine.

U.S. Pat. No. 9,873,296 describes a method for reducing vertical machine oscillations of an agricultural machine with a drive engine, a running gear cooperating with the drive engine for driving wheels having pneumatic tires, and a control unit for regulating a tire pressure of at least one tire. For example, the method includes generating a sensor signal as a function of at least one determined machine oscillation and regulating a tire pressure of at least one tire by the control unit as a function of the sensor signal in order to reduce the determined machine oscillation.

SUMMARY

Some embodiments of the present disclosure provide a system controlling an autonomous machine comprising a tractor unit, a trailer unit; one or more accelerometers that measure acceleration of the tractor unit and/or the trailer unit along three perpendicular axes, and a velocity sensor for measuring a velocity of the autonomous machine. The system includes a controller that is configured to: receive acceleration data from the one or more accelerometers; receive velocity data from the velocity sensor, and determine whether the acceleration, where the acceleration comprises a vibrational acceleration, of the tractor unit and/or the trailer unit exceeds a predetermined maximum acceleration threshold, e.g., the acceleration component of machine vibrations of the tractor and/or trailer exceed an acceleration threshold. If the controller determines that that the acceleration of at least one of the tractor unit and the trailer unit exceeds the predetermined maximum acceleration threshold, the controller controls the machine to reduce its velocity until the acceleration (vibration) of at least one of the tractor unit and the trailer unit has decreased below the predetermined maximum acceleration threshold. After a time delay, the controller subsequently increases the velocity of the autonomous machine towards and up to a predetermined maximum velocity threshold for the autonomous machine.

In some embodiments of the present disclosure, a method of controlling an autonomous machine of the type comprising a tractor unit and a trailer unit is provided. The method includes measuring an acceleration of at least one of the tractor unit and the trailer unit along three perpendicular axes, measuring a velocity of the autonomous machine; comparing the acceleration of at least one of the tractor unit and the trailer unit with a predetermined maximum acceleration threshold. If the measured acceleration of at least one of the tractor unit and the trailer unit exceeds the predetermined maximum acceleration threshold, the velocity of the autonomous machine is reduced until the acceleration of at least one of the tractor unit and the trailer unit has decreased below the predetermined maximum acceleration threshold. After a time delay, the velocity of the autonomous machine is increased towards and up to a predetermined maximum velocity.

In some embodiments, there is provided a method of controlling an autonomous machine of the type comprising a tractor unit and a trailer unit. The control method includes, using a model of machine operation to determine what velocity to operate the autonomous machine when the vibrational acceleration of the tractor unit and/or the trailer unit exceeds the threshold. In some embodiments, a pressure sensor is used to measure the pressure of at least one of the autonomous machine's tyres. The pressure measured by the pressure sensor can be used in the model to determine an operational velocity for the autonomous machine. In some embodiments, the model and the tyre pressure are used to optimize velocity of the autonomous vehicle, with the optimized velocity selected to minimize vibrations of the tractor/trailer and/or prevent power hop. The operational velocity of the autonomous machine can be adjusted when vibrational accelerations above the threshold are detected. In some embodiments, the model can be continually adjusted based upon the autonomous machine's operation, including detection of accelerations, to provide for real-time optimization of the autonomous machine's velocity. This real-time model updating accounts for changes in conditions, temperature, weather, operating surface, the condition of the autonomous machine, including tyre pressure, tyre condition and/or the like.

In some embodiments, the model may be used to provide for adjustment of the tyre pressure. In such embodiments, the tyre pressure may be adjusted to provide for an optimal operating velocity of the autonomous machine. The tyre pressure can be adjusted by an inflation mechanism on the autonomous machine and/or when the machine is serviced and/or prepared for operation.

In some embodiments, a database of abnormal event data is created. The abnormal event data relates to a point or points in time when an acceleration of at least one of a tractor unit and a trailer unit exceeded the predetermined maximum acceleration threshold. In some embodiments, the database includes additional data collected when the abnormal event occurred. This additional data can include a pressure of at least one of the tyres of the autonomous machine, the location of the autonomous machine, the temperature where the autonomous machine is operating, weather conditions, the fuel level of the autonomous machine, the charge of a battery of the autonomous machine, the payload of the autonomous machine, the payload distribution of the autonomous machine, the velocity of the autonomous machine and/or the like. The database can be used to create a model of machine operation and/or to make maintenance/service decisions with respect to the autonomous machine. In some embodiments, the database can be used to make decisions regarding the autonomous machine's payload. For example, in a fully automated worksite, the autonomous loading of the autonomous machine can be controlled based upon the model determined from the database. In some embodiments, operation of the autonomous machine can be controlled based upon a model created using the database. For example, routes for the autonomous machine can be determined that optimize velocity/travel time while avoiding occurrence of abnormal events.

DRAWINGS

Figure 2:
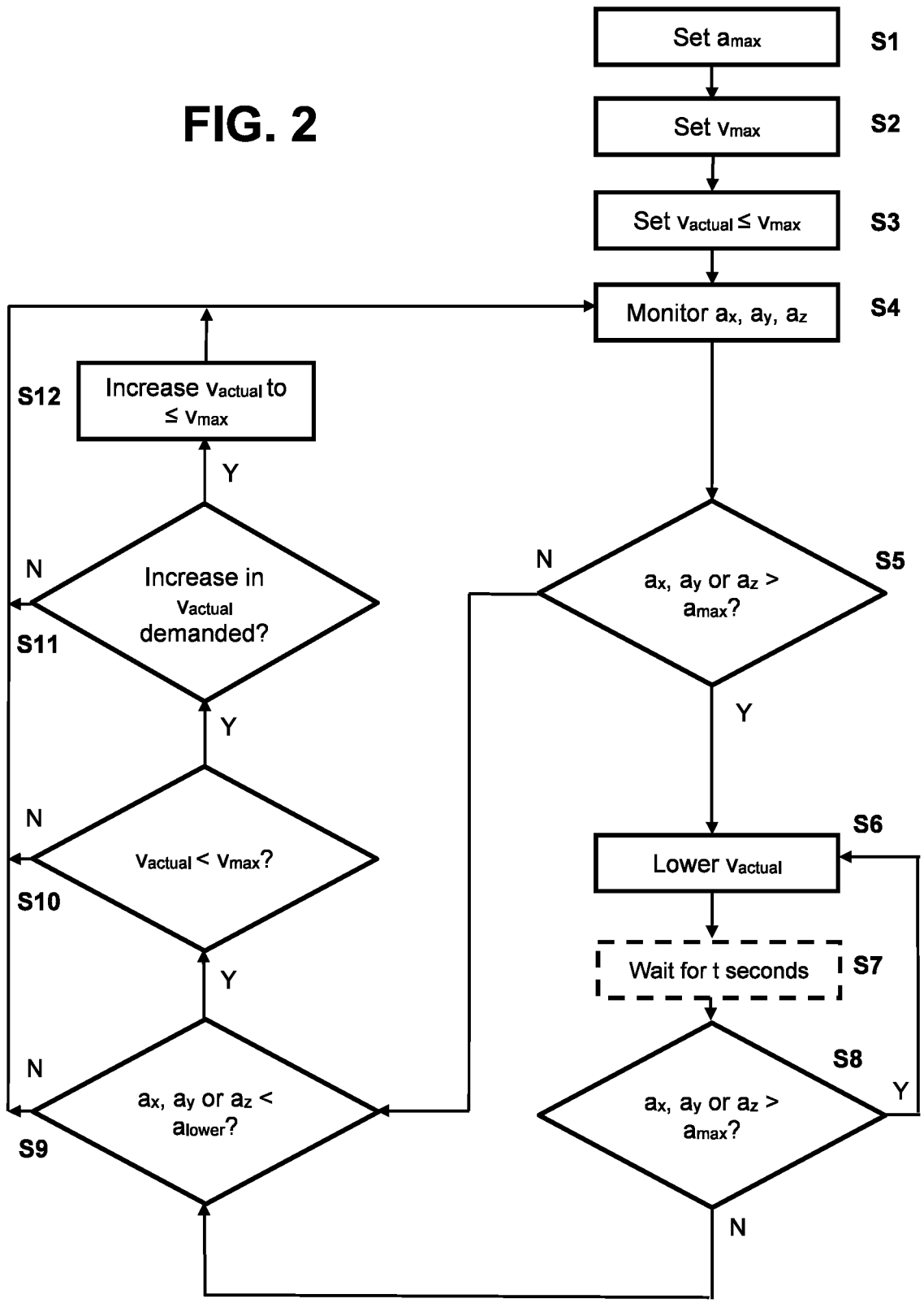

Some aspects of the present disclosure shall be described, by way of example only, with reference to the following drawings, in which:

FIG. 1 shows a schematic representation of an autonomous machine according to the present disclosure; and FIG. 2 is a flow chart illustrating an example method according to the present disclosure.

DETAILED DESCRIPTION

The present disclosure relates to autonomous machines. For example, the present disclosure relates to the configuration and operation of off-road autonomous machines.

For the purposes of the present specification, the term 'autonomous machine' refers to a machine that is capable of moving within an environment with little or no contemporaneous human input (either provided on-board or remotely by a human driver). In particular, an autonomous machine may operate without the presence of a driver on-board the machine.

The autonomous machine includes accelerometers that can measure acceleration of the tractor unit and/or the trailer unit along three perpendicular axes, and a velocity sensor for measuring a velocity of the autonomous machine. The autonomous machine includes a controller that receives acceleration data from the accelerometers and the velocity of the machine, and controls the velocity of the autonomous machine based upon vibration data generated by the accelerometers. For example, the controller reduces velocity of the autonomous machine when the acceleration detected by the accelerometers exceeds a predetermined maximum acceleration threshold.

In some embodiments, a model of machine operation is used to determine what velocity to operate the autonomous machine when the vibrational acceleration of the tractor unit and/or the trailer unit exceeds the threshold. The model can be created using machine simulations, experimental data and/or the like.

In some embodiments, a pressure sensor is used to measure the pressure of at least one of the autonomous machine's tyres. The pressure measured by the pressure sensor can be used in the model to determine the operational velocity for the autonomous machine. In some embodiments, the model and the tyre pressure are used to optimize velocity of the autonomous vehicle, with the optimized velocity selected to minimize vibrations of the tractor/trailer and/or prevent power hop. The operational velocity of the autonomous machine can be adjusted when vibrational accelerations above the threshold are detected. In some embodiments, the model can be continually adjusted based upon the autonomous machine's operation, including detection of accelerations, to provide for real-time optimization of the autonomous machine's velocity. This real-time model updating accounts for changes in conditions, temperature, weather, operating surface, the condition of the autonomous machine, including tyre pressure, tyre condition and/or the like.

In some embodiments, the model may be used to provide for adjustment of the tyre pressure. In such embodiments, the tyre pressure may be adjusted to provide for an optimal operating velocity of the autonomous machine. The tyre pressure can be adjusted by an inflation mechanism on the autonomous machine and/or when the machine is serviced and/or prepared for operation.

In some embodiments, a database of abnormal event data is created. The abnormal event data relates to a point or points in time when an acceleration of at least one of a tractor unit and a trailer unit exceeded the predetermined maximum acceleration threshold. In some embodiments, the database includes additional data collected when the abnormal event occurred. This additional data can include a pressure of at least one of the tyres of the autonomous machine, the location of the autonomous machine, the temperature where the autonomous machine is operating, weather conditions, the fuel level of the autonomous machine, the charge of a battery of the autonomous machine, the payload of the autonomous machines, the payload distribution of the autonomous machine, the velocity of the autonomous machine and/or the like.

The database can be used to create a model of machine operation and/or to make maintenance/service decisions with respect to the autonomous machine. In some embodiments, the database can be used to make decisions regarding the autonomous machine's payload. For example, in a fully automated worksite, the autonomous loading of the autonomous machine can be controlled based upon the model determined from the database. In some embodiments, operation of the autonomous machine can be controlled based upon a model created using the database. For example, routes for the autonomous machine can be determined that optimize velocity/travel time while avoiding occurrence of abnormal events.

FIG. 1 shows schematically an example of an autonomous machine 1 according to the present disclosure. The autonomous machine 1 comprises a tractor unit 2 and a trailer unit 3. The trailer unit 3 may be detachably coupled to the tractor unit 2. The trailer unit 3 may be articulated to the tractor unit 2. An articulated joint 7 may be provided that allows pivoting of the tractor unit 2 relative to the trailer unit 3.

The autonomous machine 1 may be configured for use in the construction industry. The autonomous machine 1 may, for example, be an articulated dump truck (ADT).

The tractor unit 2 may comprise a source of motive power. For example, the source of motive power may be an internal combustion engine (ICE), one or more electric motors, or a hybrid power train comprising both an ICE and one or more electric motors.

The tractor unit 2 may comprise wheels and or tracks.

The trailer unit 3 may be unpowered, i.e. only pulled by the action of the tractor unit 2. Alternatively, the trailer unit 3 may comprise an additional source of motive power supplemental to that of the tractor unit 2. For example, the trailer unit 3 may be provided with one or more electric motors that may be associated with one or more wheels or axles of the trailer unit 3. This example may find particular application where the tractor unit 2 comprises one or more electric motors or a hybrid power train.

The trailer unit 3 may be, for example, a wheeled or tracked trailer unit 3.

The autonomous machine 1 is provided with one or more accelerometers 3A, 3B configured to measure acceleration of at least one of the tractor unit 2 and the trailer unit 3 along three perpendicular axes x, y, z.

The three perpendicular axes x, y, z may be chosen, for example, such that a first axis x is a front-to-back axis of the autonomous machine 1, a second axis y is a side-to-side axis of the autonomous machine 1 and a third axis z is a top-to-bottom axis of the autonomous machine 1, as shown schematically on FIG. 1. This may be achieved by suitable alignment of the one or more accelerometers 3A, 3B. However, this example arrangement of the three perpendicular axes x, y, z is not essential and a different alignment of the accelerometers may be chosen without departing from the scope of the present disclosure.

The one or more accelerometers 3A, 3B may comprise one or more tractor unit accelerometers 3A associated with the tractor unit 2. Additionally or alternatively, the one or more accelerometers may comprise one or more trailer unit accelerometers 3B associated with the trailer unit 3. In some examples the one or more accelerometers may consist of only one or more accelerometers 3A associated with the tractor unit 2.

The one or more accelerometers 3A, 3B—for example the one or more tractor unit accelerometers 3A and or the one or more trailer unit accelerometers 3B—may each comprise spatially separate accelerometers for each of the axes x, y, z. Alternatively, two or more of the accelerometers may be integrated into an accelerometer package. For example, the one or more tractor unit accelerometers 3A may comprise a three-axis accelerometer package and the one or more trailer unit accelerometers 3B may comprise a three-axis accelerometer package.

The one or more tractor unit accelerometers 3A and or the one or more trailer unit accelerometers 3B may be functionally interconnected with each other (shown schematically in FIG. 1 by a dotted line). The functional interconnection may be a wired or wireless connection. The wireless connection may use a short range wireless connection protocol, for example Bluetooth® or Bluetooth® Low Energy (BLE).

A velocity sensor 4 is provided configured to measure a velocity of the autonomous machine 1. One or more velocity sensors 4 may be provided. A velocity sensor 4 may be associated with the tractor unit 2 and or the trailer unit 3. The velocity sensor 4 may, for example, be associated with one or more of the wheels or tracks of the tractor unit 2 and or the trailer unit 3 and determine the velocity of the autonomous machine 1 based on a rotational speed of the wheels or tracks. The velocity sensor 4 may be an electronic sensor, an optical sensor, a mechanical sensor or combination thereof. Alternatively, the velocity sensor 4 may be a global navigation satellite system (GNSS) based sensor that determines velocity based on positional and time data obtained from a system such as the GPS, GLONASS, BeiDou or Galileo satellite systems.

The autonomous machine 1 further comprises a controller 5. The controller 5 is typically provided in the tractor unit 2 but may be provided in the trailer unit 3 or in both the tractor unit 2 and the trailer unit 3. The controller 5 may comprise hardware and/or software. The controller 5 may comprise a control unit or may be a computer program running on a dedicated or shared computing resource. The controller 5 may comprise a single unit or may be composed of a plurality of sub-units that are operatively connected. The controller 5 may be located on one processing resource or may be distributed across spatially separate computing resources. The controller 5 may comprise one or more programmable and or non-programmable memory units or sub-units. The controller 5 may comprise data storage and handling units or sub-units. The controller 5 may comprise or form part of an engine electronic control module (ECM) of the autonomous machine 1.

The controller 5 is configured to receive acceleration data from the one or more accelerometers 3A, 3B and to receive velocity data from the velocity sensor 4.

The controller 5 may be functionally interconnected with the one or more accelerometers 3A, 3B and the velocity sensor 4 (shown schematically in FIG. 1 by the dotted lines). The functional interconnections may be a wired or wireless connections. The wireless connection may use a short range wireless connection protocol, for example Bluetooth® or Bluetooth® Low Energy (BLE). The one or more trailer unit accelerometers 3B may be functionally interconnected with the controller 5 via the one or more tractor unit accelerometers 3A. The controller 5 may be configured to operatively control the one or more accelerometers 3A, 3B and the velocity sensor 4 and or receive data from the one or more accelerometers 3A, 3B and the velocity sensor 4.

The autonomous machine 1 may further comprise a communication module 6. The communication module 6 may be configured to communicate with a remote resource located outside of the autonomous machine 1. The communication module 6 may use a wireless connection to transmit signals to the remote resource and receive signals from the remote resource. The wireless connection may use a short range, medium range or long range wireless connection protocol. For example Bluetooth® or Bluetooth® Low Energy (BLE) wireless connection protocols may be used for short range operation, GSM or UMTS mobile networks may be used for medium or long range operation.

The controller 5 may be functionally interconnected with the communications module 6 (shown schematically in FIG. 1 by a dotted line). The functional interconnection may be a wired or wireless connection. The wireless connection may use a short range wireless connection protocol, for example Bluetooth® or Bluetooth® Low Energy (BLE). The controller 5 may be configured to operatively control the communications module 6 and or exchange data with the communications module 6.

A database 8 of abnormal event data may be provided. The abnormal event data may comprise i) the velocity of the autonomous machine 1; and ii) at least one additional characterising parameter which may be recorded at particular points of time as will be discussed further below.

The at least one additional characterising parameter may comprise one or more of: tire pressures of the autonomous machine 1, the location of the autonomous machine 1, the ambient temperature and/or weather conditions where the autonomous machine 1 is operating, a fuel level of the autonomous machine 1, a charge of a battery of the autonomous machine 1, a payload mass of the trailer unit 3, a payload distribution of the trailer unit 3, and surface conditions experienced by the autonomous machine 1, e.g. wet/dry road surface.

The database 8 may be located on-board the autonomous machine 1. Alternatively, the database 8 may be located remote from the autonomous machine 1. The controller 5 may be functionally interconnected with the database 8, for example via the communications module 6.

INDUSTRIAL APPLICABILITY

The autonomous machine 1 of the present disclosure may advantageously mitigate or eliminate the problem of unwanted machine oscillations and or excessive vibration. For example, the autonomous machine 1 of the present disclosure may advantageously mitigate or eliminate 'power hop', i.e. substantial vertical oscillations. Additionally or alternatively, the autonomous machine 1 of the present disclosure may advantageously mitigate or eliminate unwanted oscillations arising from the presence of a trailer unit 3, for example 'trailer kick'. 'Trailer kick' refers to oscillations in the horizontal plane imparted on the tractor unit 2 by the trailer unit 3. The oscillations may be in a side-to-side direction which may negatively affect steering of the autonomous machine 1, in a front-to-back direction which may negatively affect traction of the autonomous machine 1, or a combination of both. Additionally or alternatively, the autonomous machine 1 of the present disclosure may advantageously mitigate or eliminate other excessive vibrations of the tractor unit 2 and or trailer unit 3.

Unwanted machine oscillations, for example 'power hop' and 'trailer kick', as well as excessive vibration of the autonomous machine 1, may lead to earlier failure of components. By mitigating of eliminating unwanted machine oscillations and or excessive vibration, the present disclosure may improve component life cycles.

Advantageously, the present disclosure may mitigate or eliminate the problem of unwanted machine oscillations and or excessive vibration without the need to alter tire pressures of the machine. In addition, the present disclosure may be enabled to mitigate or eliminate the problem of unwanted machine oscillations and or excessive vibration without any contemporaneous human input (either provided on-board or remotely by a human driver). Thus, the present disclosure finds particular application in autonomous machines where a driver will not be present.

In operation, the controller 5 of the autonomous machine 1 is configured to receive acceleration data from the one or more accelerometers 3A, 3B and determine whether the acceleration of at least one of the tractor unit 2 and the trailer unit 3 exceeds a predetermined maximum acceleration threshold $a_{max}$. In the event that the acceleration of at least one of the tractor unit 2 and the trailer unit 3 does exceed the predetermined maximum acceleration threshold $a_{max}$ the controller 5 is configured to reduce a velocity v of the autonomous machine 1. In this manner the acceleration of the tractor unit 2 and or trailer unit 3 may be beneficially reduced below the predetermined maximum acceleration threshold $a_{max}$.

The acceleration data may comprise data on the components of acceleration $a_x$, $a_y$, $a_z$ of at least one of the tractor unit 2 and the trailer unit 3 along each of the three perpendicular axes x, y, z.

The acceleration used by the controller 5 to determine if the predetermined maximum acceleration threshold $a_{max}$, has been exceeded may be a component of the acceleration $a_x$, $a_y$, $a_z$ in the direction of one of the three perpendicular axes x, y, z or may be a resultant acceleration having components of acceleration in two or three of the three perpendicular axes x, y, z.

For example, in a first example the controller 5 may compare only the component of the acceleration along the x axis $a_x$ when determining if the predetermined maximum acceleration threshold $a_{max}$ has been exceeded. This may be applicable, for example, where there is a desire to limit 'push' and 'pull' oscillations being imparted on the tractor unit 2 from the trailer unit 3.

In a second example, the controller 5 may compare the resultant acceleration of the components of acceleration along the x axis $a_x$ and the y axis $a_y$ when determining if the predetermined maximum acceleration threshold $a_{max}$ has been exceeded. This may be applicable, for example, where there is a desire to limit 'trailer kick' oscillations being imparted on the tractor unit 2 from the trailer unit 3.

In a third example, the controller 5 may compare the resultant acceleration of all three components of acceleration $a_x$, $a_y$, $a_z$ when determining if the predetermined maximum acceleration threshold $a_{max}$ has been exceeded. This may be applicable, for example, where there is a desire to mitigate excessive vibrations of the tractor unit 2 and or the trailer unit 3.

The predetermined maximum acceleration threshold $a_{max}$ may be 1.5 to 2.0 $ms^{-2}$.

The predetermined maximum acceleration threshold $a_{max}$ may be stored in the controller 5. The controller 5 may additionally store a maximum velocity threshold $v_{max}$ for the autonomous machine 1. The controller 5 may be preprogrammed with the predetermined maximum acceleration threshold $a_{max}$ and or the maximum velocity threshold $v_{max}$. The programming of the controller 5 may be carried out during manufacture or commissioning of the autonomous machine 1 or subsequently. The controller 5 may be configured to set the predetermined maximum acceleration threshold $a_{max}$ and or the maximum velocity threshold $v_{max}$ based on transmissions received by the communication module 6 from outside of the tractor unit 2 or autonomous machine 1. This may advantageously allow the thresholds to be updated as necessary during operation of the autonomous machine 1 without requiring the autonomous machine 1 to return to a maintenance depot.

Operation of the controller 5 may enable a method of controlling the autonomous machine 1 comprising the steps of:
  measuring the acceleration of at least one of the tractor unit 2 and the trailer unit 3 along three perpendicular axes x, y, z;
  measuring the velocity v of the autonomous machine 1;
  comparing the acceleration of at least one of the tractor unit 2 and the trailer unit 3 with the predetermined maximum acceleration threshold $a_{max}$; and
  in the event that the acceleration of at least one of the tractor unit 2 and the trailer unit 3 exceeds the predetermined maximum acceleration threshold $a_{max}$ reducing the velocity v of the autonomous machine 1.

The controller 5 may operate to subsequently increase the velocity v of the autonomous machine 1 towards and up to the predetermined maximum velocity threshold $v_{max}$ once the acceleration of at least one of the tractor unit 2 and the trailer unit 3 has decreased below the predetermined maximum acceleration threshold $a_{max}$.

The controller 5 may operate such that subsequently increasing the velocity v of the autonomous machine 1 towards and up to the predetermined maximum velocity threshold $v_{max}$ occurs after a time delay t.

FIG. 2 provides a flow chart illustrating an example mode of operation. In this example the controller 5 monitors acceleration along all three perpendicular axes x, y, z.

The predetermined maximum acceleration threshold $a_{max}$ is set at Step S1 and the maximum velocity threshold $v_{max}$ is set at Step S2. At Step S3, the controller 5 operates to move the autonomous machine 1 at a velocity $v_{actual}$ that is less than or equal to $v_{max}$.

At Step S4, the controller 5 monitors the components of acceleration $a_x$, $a_y$, $a_z$.

At Step S5 the controller 5 determines if any of the components of acceleration or the resultant acceleration exceeds the predetermined maximum acceleration threshold $a_{max}$.

If the answer to Step S5 is YES then the controller 5 lowers the current velocity $v_{actual}$ at Step S6.

At optional Step S7 the controller 5 may wait t seconds for the lower velocity to impact the accelerations of the autonomous machine 1. The value of t seconds may vary depending on the specific arrangement of the autonomous machine 1. For example, t may be from 1 to 10 seconds.

At Step S8, the controller 5 again determines if any of the components of acceleration or the resultant acceleration still exceed the predetermined maximum acceleration threshold $a_{max}$.

If the answer to Step S8 is YES then the controller 5 loops back to Step S6 to further lower the current velocity $v_{actual}$.

If the answer to Step S8 is NO then the controller 5 determines at Step S9 if the components of acceleration and the resultant acceleration are less than a lower acceleration threshold $a_{lower}$. The variable $a_{lower}$ is a threshold that is a value that is smaller than $a_{max}$ by an amount effective to prevent unwanted rapid increases and decreases in the current velocity $v_{actual}$. For example, the predetermined maximum acceleration threshold $a_{max}$ may be set at 1.5 ms$^{-2}$ and the lower acceleration threshold $a_{lower}$ set at 1.3 ms$^{-2}$. In this way an amount of velocity hysteresis may be built into the control scheme.

If the answer to Step 9 is NO then the controller 5 loops back to Step S4 to continue monitoring the components of acceleration $a_x$, $a_y$, $a_z$.

If the answer to Step S9 is YES then the controller 5 determines at Step S10, based on data received from velocity sensor 4, whether the current velocity $v_{actual}$ is less than the maximum velocity threshold $v_{max}$.

If the answer to Step S10 is NO ($v_{actual}=v_{max}$) then the controller 5 loops back to Step S4 to continue monitoring the components of acceleration $a_x$, $a_y$, $a_z$.

If the answer to Step S10 is YES the controller 5 determines at Step S11 if there is a demand to increase the current velocity $v_{actual}$. This demand may originate from another routine running on the controller 5.

If the answer to Step S11 is NO then the controller 5 loops back to Step S4 to continue monitoring the components of acceleration $a_x$, $a_y$, $a_z$.

If the answer to Step S11 is YES then the controller 5 at Step S12 increases the current velocity $v_{actual}$ to the demanded velocity (as limited by the maximum velocity threshold $v_{max}$) and then loops back to Step S4 to continue monitoring the components of acceleration $a_x$, $a_y$, $a_z$.

Returning to Step S5, if the answer to Step S5 is NO then the controller 5 moves to Step S9 and determines if the components of acceleration and the resultant acceleration are less than the lower acceleration threshold $a_{lower}$. The operation then continues as described above.

Alternatively or additionally a method of controlling the autonomous machine 1 may comprise the steps of:
 i) creating a database 8 of abnormal event data, wherein the abnormal event data relates to a point or points in time when an acceleration of at least one of a tractor unit and a trailer unit exceeded a predetermined maximum acceleration threshold $a_{max}$;
 ii) measuring a current acceleration of at least one of the tractor unit 2 and the trailer unit 3 along three perpendicular axes x, y, z, a current velocity $v_{actual}$ of the autonomous machine 1, and at least one additional current characterising parameter;
 iii) comparing the current acceleration, the current velocity $v_{actual}$, and the at least one additional current characterising parameter with the database 8 of abnormal event data;
 iv) based on said comparison, predicting when the current acceleration of at least one of the tractor unit 2 and the trailer unit 3 will exceed the predetermined maximum acceleration threshold $a_{max}$; and
 v) performing a mitigating action to prevent the acceleration of at least one of the tractor unit 2 and the trailer unit 3 exceeding the predetermined maximum acceleration threshold $a_{max}$.

The mitigating action may comprises one or more of reducing the current velocity $v_{actual}$ of the autonomous machine 1 and adjusting the tire pressures of the autonomous machine 1.

The abnormal event data may comprises the velocity $v_{actual}$ of the autonomous machine and at least one additional characterising parameter. The at least one additional characterising parameter may comprise one or more of: tire pressures of the autonomous machine 1, the location of the autonomous machine 1, the ambient temperature and/or weather conditions where the autonomous machine 1 is operating, a fuel level of the autonomous machine 1, a charge of a battery of the autonomous machine 1, a payload mass of the trailer unit 3, a payload distribution of the trailer unit 3, and surface conditions experienced by the autonomous machine 1, e.g. wet/dry road surface.

The database 8 of abnormal event data may comprise historical abnormal event data from a plurality of autonomous machines each comprising a tractor unit 2 and a trailer unit 3.

The database 8 may comprise a machine-learning module that learns from the historic abnormal event data to be able to predict when the predetermined maximum acceleration threshold $a_{max}$ may be exceeded in new scenarios for which there is no exact historical match present in the database 8.

The database 8 may be interconnected simultaneously with a plurality of autonomous machines 1.

It will be appreciated by the reader that features of each of the examples of the present disclosure may be combined with each other as desired unless the context explicitly dictates otherwise and such combinations are to be considered as included in the present disclosure.

The invention claimed is:

1. An autonomous machine, the autonomous machine being fully autonomous and operating in an off-road environment, comprising:
   a tractor unit including one or more tractor accelerometers configured to measure acceleration of the tractor unit along three perpendicular axes of the tractor unit;
   a trailer unit including one or more trailer accelerometers configured to measure acceleration of the trailer unit along three perpendicular axes of the trailer unit;
   a velocity sensor configured to measure a velocity of the autonomous machine; and
   a controller for:
     receiving acceleration data from the one or more trailer accelerometers and the one or more tractor accelerometers, wherein the acceleration data includes a component of acceleration of the tractor unit along the three perpendicular axes of the tractor unit and includes a component of acceleration of the trailer unit along the three perpendicular axes of the trailer unit;
     receiving velocity data from the velocity sensor;
     determining whether one or more components of the acceleration of the tractor unit and one or more components of the acceleration of the trailer unit exceed a predetermined maximum acceleration threshold;

reducing the velocity of the autonomous machine if one or more of the components of acceleration of the trailer unit or one or more components of acceleration of the tractor unit exceed the predetermined maximum acceleration threshold, wherein velocity is reduced until each of the one or more components of acceleration of the tractor unit and each of the one or more components of acceleration of the trailer unit is below the predetermined maximum acceleration threshold; and increasing the velocity of the autonomous machine towards and up to a predetermined maximum velocity threshold for the autonomous machine.

2. The autonomous machine of claim 1, wherein the velocity of the autonomous machines is only increased towards and up to the predetermined maximum velocity threshold for the autonomous machine after a time delay.

3. The autonomous machine of claim 1, wherein the three perpendicular axes of the trailer unit and the three perpendicular axes of the tractor unit each comprise a first axis that is a front-to-back axis of the autonomous machine, a second axis that is a side-to-side axis of the autonomous machine and, a third axis which is a top-to-bottom axis of the autonomous machine.

4. The autonomous machine of claim 1, further comprising a communication module, wherein the controller is configured to set the predetermined maximum acceleration threshold based on transmissions received by the communication module from outside of the tractor unit.

5. The autonomous machine of claim 1, wherein the predetermined maximum acceleration threshold is 1.5 to 2.0 ms-2.

6. The autonomous machine of claim 1, wherein the autonomous machine is an articulated dump truck (ADT).

7. The autonomous machine of claim 1, wherein the three perpendicular axes are an x-axis, a y-axis, and a z-axis.

8. A method of controlling an autonomous machine of the type comprising a tractor unit and a trailer unit and being fully autonomous, operating in an off-road environment, the method comprising the steps of:

measuring three components of a vibration acceleration of the tractor unit via one or more tractor accelerometers on the tractor unit;

measuring three components of a vibration acceleration of the trailer unit via one or more trailer accelerometers on the trailer unit;

measuring a velocity of the autonomous machine;

comparing each component of the vibration acceleration of the tractor unit with a predetermined maximum vibration acceleration threshold;

comparing each component of the vibration acceleration of the trailer unit with the predetermined maximum vibration acceleration threshold;

in the event that one or more of the components of the vibration acceleration of the tractor unit and one or more of the components of the vibration acceleration of the trailer unit exceeds the predetermined maximum vibration acceleration threshold, reducing the velocity of the autonomous machine until each component of the vibration acceleration of the tractor unit and each component of the vibration acceleration of the trailer unit is below the predetermined maximum vibration acceleration threshold; and increasing the velocity of the autonomous machine towards and up to a predetermined maximum velocity threshold;

wherein, the three components of the vibration acceleration of the tractor unit and the three components of the vibration acceleration of the trailer unit each include an x-axis component, a y-axis component, and a z-axis component.

9. The method of claim 8, wherein the velocity of the autonomous machine is increased towards and up to the predetermined maximum velocity threshold only after a time delay.

10. The method of claim 8, wherein the predetermined maximum vibration acceleration threshold is 1.5 to 2.0 ms-2.

11. The method of claim 8, further comprising:

detecting an abnormal event, wherein the abnormal event is detected when the vibrational acceleration of the tractor unit or the trailer unit exceeds the predetermined maximum vibration acceleration threshold; and using a machine operation model to process an operating velocity for the autonomous machine when the abnormal event data is detected.

12. The method of claim 11, further comprising:

measuring a pressure of at least a one of the autonomous machine's tyres and using the measured pressure with the machine operation model to process the operating velocity.

13. The method of claim 11, further comprising:

updating the machine operation model using at least one of the detected abnormal event, the velocity and the tyre pressure.

14. The method of claim 13, further comprising:

updating the machine operational model using at least one additional characterising parameter comprising one or more of:

ambient temperature;

a payload mass of the trailer unit;

a payload distribution of the trailer unit; and surface conditions.

15. The method of claim 11, wherein the machine operation model is used to schedule servicing of the autonomous machine and/or to adjust a tyre pressure of one or more of the autonomous machine's tyres.

16. The method of claim 11, wherein the machine operation model is used to adjust the predetermined maximum velocity threshold.

* * * * *